June 25, 1946. G. A. KRAFT 2,402,822
CINEMATIC SET
Filed Oct. 14, 1944
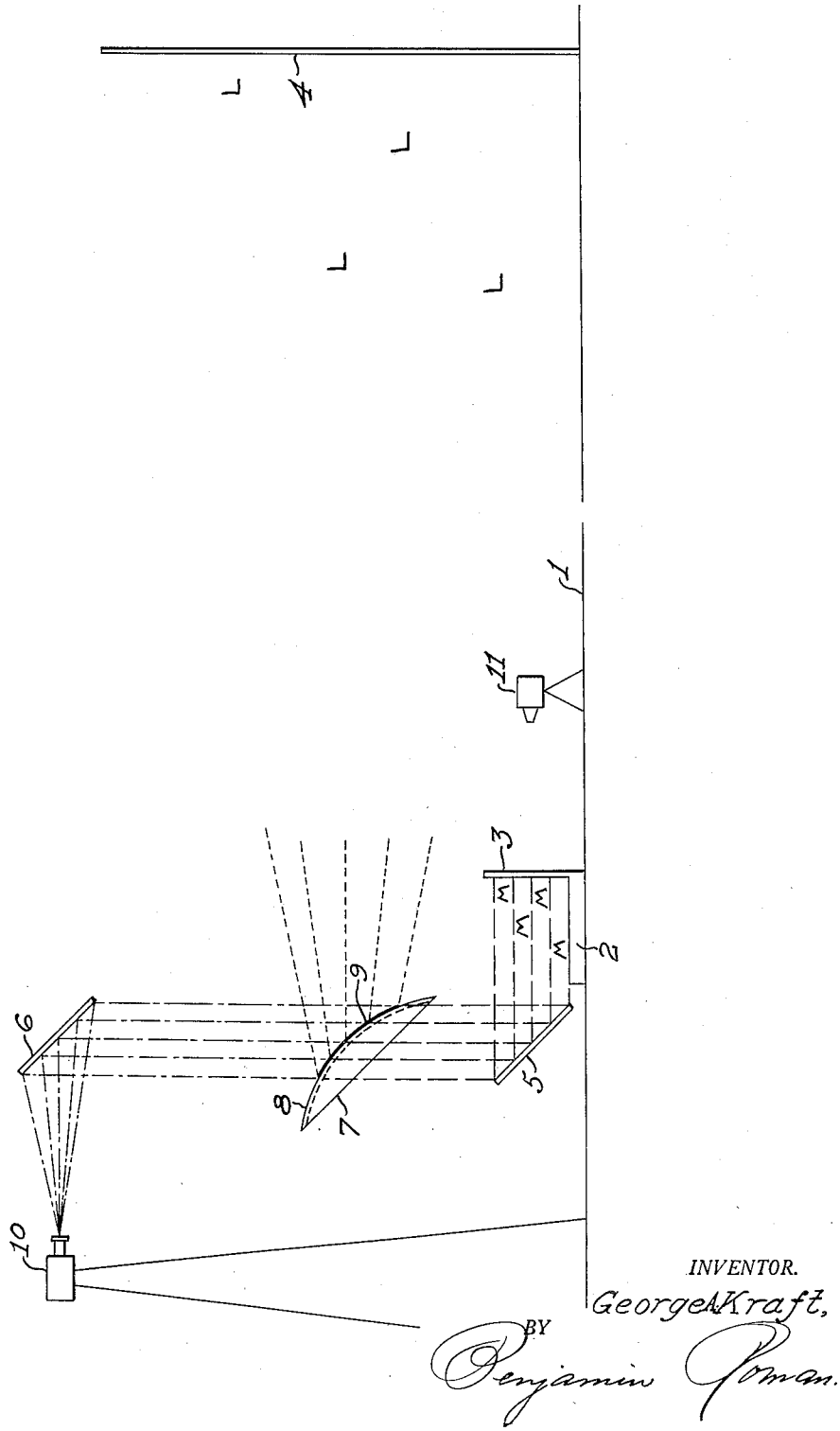
INVENTOR.
George A Kraft,
BY
Benjamin Oman.

Patented June 25, 1946

2,402,822

UNITED STATES PATENT OFFICE 2,402,822

CINEMATIC SET

George A. Kraft, New York, N. Y.

Application October 14, 1944, Serial No. 558,676

4 Claims. (Cl. 88—16)

This invention relates to a set entering into the production of cinematic or television pictures. The normal provision of natural scenery and properties for creating such sets involves great difficulties, as sometimes the scenery is unavailable, the making of properties is costly and time-consuming, and the expense of bringing to locations the performers, properties, staffs, and equipments is almost prohibitive. These problems are particularly accentuated in the making of television pictures, in the production of which the studios and other facilities are much smaller and less available.

The principal object of the invention is to provide a simplified, efficient, uncostly, and improved cinematic set for the above purpose, as well as an efficient and improved method for producing cinematic and television pictures.

Other objects and advantages will hereinafter appear.

The accompanying drawing represents an elevational diagrammatic illustration showing the cinematic set constituting the invention.

Upon the ground 1 is located a platform 2, a backdrop 3, and items M, all of which represent in miniature the scene in which the action is required to occur. At a requisite distance beyond the miniature scene M is located an action scene L, preferably against a black or dark back-drop wall 4. In front of the miniature scene M is situated an inclined mirror 5, and remotely from it at an elevation is situated a similar mirror 6 facing the mirror 5. Between the mirrors 5, 6 and opposed to the action scene L is located a body 7 consisting of a transparent glass oblate plate having upon its convexed surface 8 a mirroring material 9. The surface 8 and material 9 are capable of creating a condensed reflected image thereupon of the opposing action scene L, while any reflected image from the mirror 5 can penetrate the glass plate of body 7 as well as its mirroring material 9.

The miniature scene M may consist of a diorama, stage scenery, or whatever the scenario may require, while in the action scene L participate the players who may utilize moving objects and also some simple furniture as tables, chairs, etc. Where such furniture is however utilized it corresponds in scale and position to similar articles existing in the miniature scene M. Appropriate lighting and other necessary effects may be resorted to in connection with both the animated or acted scene L and the miniature scenery M.

During the action and taking of the picture with this cinematic set, the view in action scene L is reflected in a condensed or reduced size image upon convexed mirroring material 9, as indicated by the dotted lines. Simultaneously, the miniature scene M is reflected in the mirror 5, and is deflected by the latter toward the glass plate body 7, as indicated by the dash lines, whereat the reflected scene M is merged with the condensed image in mirroring material 9 and both are therefrom deflected to the mirror 6, as indicated by the dash and dot lines. As the positioning of scene L, relatively to the body 7, is such as to reduce the condensed image in material 9 to the same scale as that of the miniature scene M, the combined images of both these scenes in the mirror 6 create in the latter the complete illusion as if the actors and occurrences in scene L were situated within the miniature scene M. This completed picture or scene in mirror 6 may be therefore recorded by a camera 10, or transmitted by a television apparatus in place of said camera.

It will be evident, therefore, that by utilization of this cinematic set and method, there may be produced photographic pictures or television broadcasts without resort to natural scenery, or full-size sets, within limited studio space, with conveniences, and at low cost.

According to a modification of the invention, the backdrop 3 of miniature scene M may be made as a translucent screen, and a projector 11 positioned therebeyond for throwing pictures upon the screen in the scene M, as may be required by the scenario in connection with occurrences of the combined scenes L, M.

Variations may be resorted to within the scope of the invention.

Having thus described my invention, I claim:

1. A cinematic set comprising a miniature scene, an action scene situated at the rear of said miniature scene, a first inclined mirror situated in front of said miniature scene for thereon reflecting the miniature scene, a second mirror disposed in elevation above said first mirror, a transparent element having a convexed mirrored surface being located between said mirrors, said action scene being condensedly reflected by said surface to a scale approximating that of said miniature scene, said miniature scene reflected from said first mirror penetrating said element and being merged on said surface with said condensed action scene, and said second mirror receiving said merged scenes for reflection to a camera or television transmitter.

2. A cinematic set as in claim 1, characterized by its said action scene having therebeyond a blackened background.

3. A cinematic set as in claim 1, characterized by its said miniature scene having therebeyond a translucent screen for cinematic projection on said screen with a projector therebeyond.

4. A cinematic set as in claim 1, characterized by its said action scene having therebeyond a blackened background, and its said miniature scene having therebeyond a translucent screen for projection on said screen.

GEORGE A. KRAFT.